Nov. 29, 1966 S. SILVA 3,288,436
LIFT MECHANISM
Filed Sept. 28, 1965
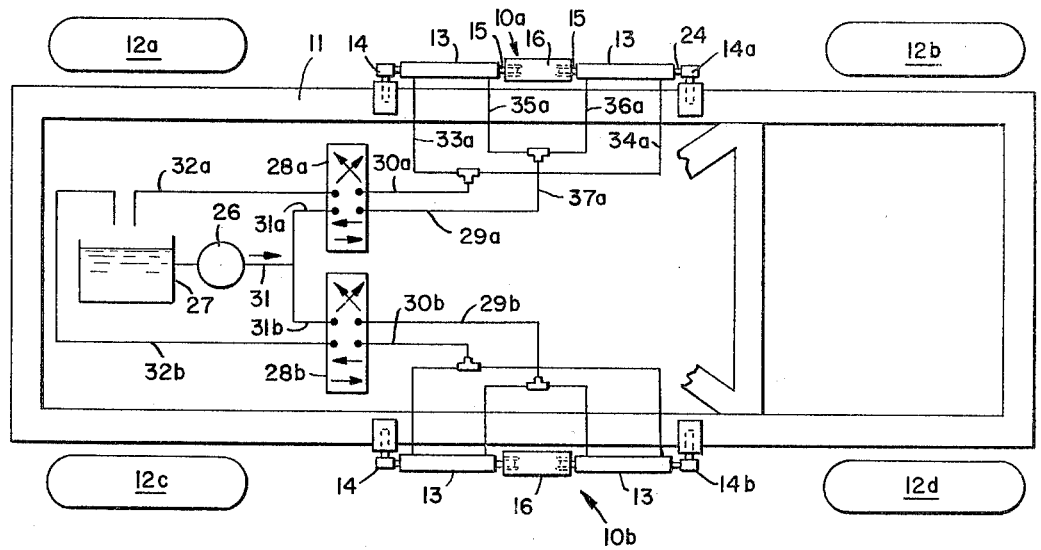
FIG_1
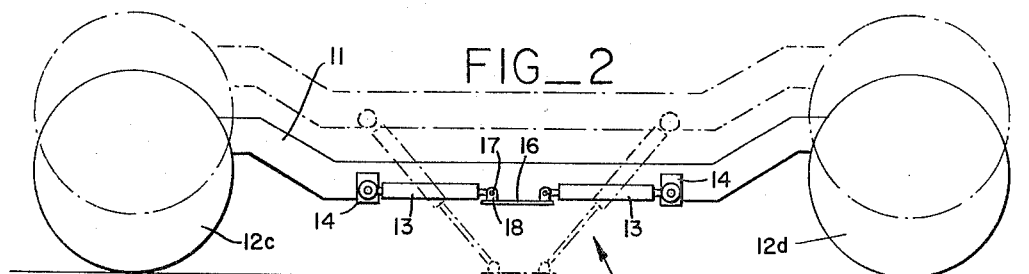
FIG_2
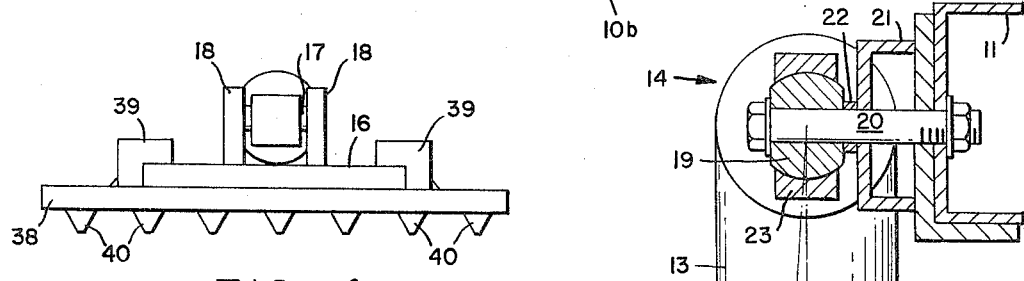
FIG_4
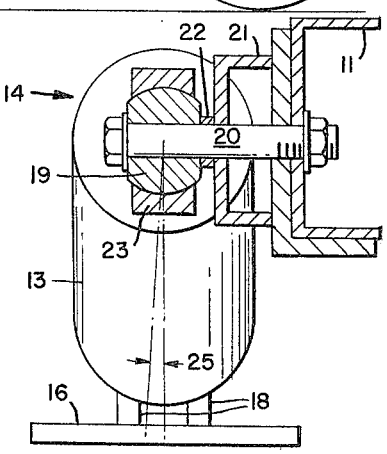
FIG_3
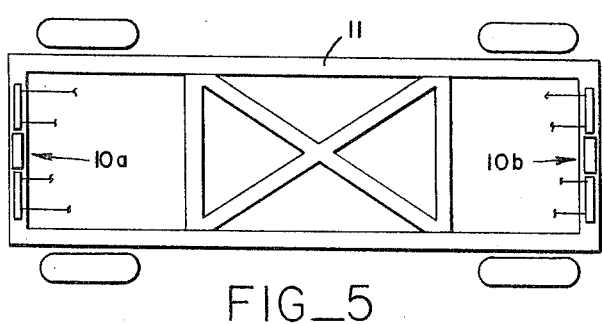
FIG_5
INVENTOR.
STANLEY SILVA
BY
Mellin, Moore & Weissenberger
ATTORNEYS

United States Patent Office 3,288,436
Patented Nov. 29, 1966

3,288,436
LIFT MECHANISM
Stanley Silva, 3801 McKee Road, San Jose, Calif.
Filed Sept. 28, 1965, Ser. No. 490,913
4 Claims. (Cl. 254—86)

This invention relates to a mechanism for lifting or jacking-up a wheeled vehicle to, for example, change a tire or install chains. More particularly, the invention comprises a pair of opposed hydraulically actuated cylinders secured to opposite sides of the vehicle frame, each pair of cylinders having a bearing plate which is raised and lowered to thereby lower and raise the vehicle.

The customary method of raising a tire off the ground relies on a portable jack which is placed between the ground and the vehicle and then extended through the application of operator power.

The present invention provides a mechanism permanently in place, which, when actuated, lifts one side of the vehicle frame upwardly thereby lifting both wheels or tires on one side of the vehicle off the ground. It is electrically powered and accordingly eliminates the need for operator power. In addition, the step of locating a portable jack and placing it into position is also eliminated.

The invention is particularly advantageous when used to change a tire or to install chains in inclement weather since the time required to raise the wheels off the ground is considerably reduced. The saving of time is also significant when a tire must be changed in heavy traffic.

The invention comprises two pair of hydraulically actuated cylinders universally pivotally mounted to the vehicle frame at points horizontally spaced on the periphery thereof opposite one another. Each of the cylinders has a piston rod extending longitudinally therefrom which opposes the piston rod in the other cylinder which constitutes the pair. Each of the opposed piston rods in one pair is pivotally mounted to a bearing plate. The cylinders are hydraulically actuated by a system which simultaneously forces the piston rods in opposed directions so that the bearing plate is lowered, with opposed extension of the piston rods, and raised, with opposed retraction of the piston rods. One pair of cylinders should be actuated exclusive of the other pair.

Accordingly it is an object of this invention to provide a mechanism for lifting the vehicle frame to thereby elevate the wheels of the vehicle off the ground.

It is a further object to provide a mechanism as described above which is hydraulically actuated and does not require human power in operation.

It is a further object to provide a mechanism for lifting the frame of the vehicle which is hydraulically actuated and is universally pivotable at the joint between the mechanism and the frame.

Each of the above objects is embodied in the invention which appears in the drawings, wherein:

FIG. 1 is a top view of the invention and shows its relationship to the vehicle frame and shows an hydraulic system (schematically) for actuating the mechanism.

FIG. 2 is a side view of the frame and mechanism shown in FIG. 1 and shows the frame in its lowered position with the wheels supported by the ground and the mechanism in its retracted position. FIG. 2 also shows (schematically) the frame in an elevated position with the lifting mechanism lowered and in engagement with the ground.

FIG. 3 is a vertical sectional view of the joint between the lifting mechanism and the frame and shows the cylinder and bearing plate in a lowered position.

FIG. 4 is an end view of a bearing plate and shows a non-skid attachment to the bearing plate.

FIG. 5 is a top view of a vehicle frame and shows a variation in the position of the lifting mechanism on the frame.

The invention appears generally in FIGS. 1, 2 and 3. With reference particularly to FIG. 1, two pairs of cylinder, bearing plate assemblies, 10a, and 10b, are shown mounted to opposite sides of frame 11 on the periphery thereof. Frame 11 is shown in association with wheels 12a–d. The mechanism shown generally in FIG. 1 operates to raise and lower wheels 12c and 12d as shown in FIG. 2. Cylinder and bearing plate assembly 10b is shown retracted with wheels 12c and 12d in contact with the ground. The extension of cylinder and bearing plate assembly 10b and the resultant lifting of wheels 12c and 12d is shown schematically in FIG. 2.

Cylinder and bearing plate assembly 10 includes cylinders 13 which are universally pivotally mounted to frame 11 at ball and socket joint 14 and include piston rod 15. Piston rod 15 is pivotally mounted to bearing plate 16 by pin 17 in association with bearing plate bracket 18.

The universally pivotal mounting of cylinders 13 to frame 11 at ball and socket joint 14 appears in detail in FIG. 3. Ball 19 is secured to frame 11 by means of bolt 20 in association with channel shaped spacer 21 and washer spacer 22. The socket portion 23 of joint 14 is secured to cylinder 13 by means of socket extension 24 (see FIG. 1). Cylinder 13 is therefore mounted to frame 11 so that it may be pivoted in all directions within limits. Thus as piston rods 15 are extended and bearing plate 16 lowered, cylinders 13 pivot in a vertical plane passing through the two ball and socket joints 14 of one pair of cylinders or bearing plate and cylinder assembly such as 10b. In addition joint 14 pivots in a vertical plane passing through opposite ball and socket joints 14 such as joints 14a and 14b shown in FIG. 1. With reference to FIG. 3, the joint 14 allows the cylinder 13 to pivot through the angle 25 as piston rod 15 extends from the position shown in FIG. 2 to the position shown schematically in FIG. 2.

The hydraulic system for actuating cylinders 13 appears schematically in FIG. 1. It includes pump 26, reservoir 27, valves 28a and 28b which communicate with each other and cylinders 13 as shown. Pump 26 may be electrically actuated. Valves 28 serve to vary the connection between lines 29 and 30 with pressure line 31 and return line 32. Valves 28, when in the position shown, isolate cylinders 13 from pump 26. To actuate cylinders 13 and lower bearing plate 16, valve 28 is placed in the "cross" position. To avoid lowering both bearing plates, one valve such as 28b should remain in the position shown in FIG. 1 while the other valve 28a is in the "cross" position. When so positioned, valve 28a directs hydraulic fluid from line 31a to line 30a and simultaneously into lines 33a and 34a which causes piston rods 15 to emerge from cylinders 13 to thereby lower bearing plate 16. As piston rods 15 extend, hydraulic fluid is forced out of cylinders 13 through lines 35a and 36a into line 37a, line 32a, and then into reservoir 27.

To retract piston rods 15 and lift bearing plate 16 to thereby lower the vehicle, valve 28a is placed in the "direct" position which connects line 32a with line 30a and line 31a with line 29a. Pump 26 therefore forces fluid into lines 35a and 36a thereby retracting piston rods 15 and simultaneously fluid leaves cylinders 13 through lines 33a and 34b and travels through line 32a and into reservoir 27. Valve 28b operates similarly in conjunction with pump 26 to raise and lower cylinder and bearing plate assembly 10b.

FIG. 4 shows a non-skid plate 38 which contains lugs 39. Plate 38 is provided with a series of projections 40 on the lower surface thereof which penetrate into the ground and prevent skidding. Lugs 39 slide over plate 16 as shown. The non-skid plate 38 is particularly useful when lifting is done on a snowy or icy surface.

The bearing plate and cylinder assemblies need not necessarily be placed on opposite sides (as distinguished from the ends) of the vehicle. As shown in FIG. 5, the mechanism 10a and 10b may be placed on opposite ends of frame 11.

The hydraulic system shown schematically in FIG. 1 may be provided in practice in conjunction with the power steering system of a wheeled vehicle. Thus the power steering system may provide a pump and reservoir with the only additional elements needed being a pair of valves and the lines shown to connect the valves, pump and reservoir with the lifting mechanism.

Having thus described my invention, I claim:

1. A mechanism for lifting a wheeled vehicle having a frame comprising:
   a first pair of hydraulically actuated cylinders, each of said cylinders of said first pair being universally pivotally mounted to said frame at points horizontally spaced on the periphery thereof and having a piston rod extending longitudinally therefrom;
   a second pair of hydraulically actuated cylinders, each of said cylinders of said second pair being universally pivotally mounted to said frame at points horizontally spaced on the periphery thereof opposite said first pair and having a piston rod extending longitudinally therefrom;
   a horizontally disposed bearing plate pivotally mounted to each of said piston rods of said first and said second pair of hydraulically actuated cylinders;
   hydraulic means mounted to said frame for simultaneously forcing said piston rods longitudinally from and into said cylinders of said first and said second pair of cylinders respectively, to thereby lower and raise said bearing plates.

2. The mechanism of claim 1 wherein said hydraulic means comprises:
   a reservoir;
   fluid in said reservoir;
   a pump in communication with said reservoir;
   valve means in communication with said pump and said first and said second pair of cylinders, for directing said fluid under pressure from said pump simultaneously into said cylinders of said first and said second pair respectively and exclusively to simultaneously actuate said piston rods of said first and said second pair of cylinders in opposing directions.

3. The mechanism of claim 2 and a series of projections spaced on the lower horizontal surface of said bearing plates.

4. The mechanism of claim 2 wherein each of said cylinders is universally pivotally mounted to said frame by means of a ball-and-socket joint.

References Cited by the Examiner

UNITED STATES PATENTS

| | | | |
|---|---|---|---|
| 1,924,276 | 8/1933 | Gertstenberger | 254—86 |
| 2,115,328 | 4/1938 | Cola et al. | 254—86 |

WILLIAM FELDMAN, *Primary Examiner.*

OTHELL M. SIMPSON, *Examiner.*